(12) United States Patent
Zheng et al.

(10) Patent No.: US 11,047,536 B2
(45) Date of Patent: Jun. 29, 2021

(54) TUBULAR LED FIXTURE (71) Applicants: Self Electronics Co., Ltd., Zhejiang (CN); Wanjiong Lin, Zhejiang (CN); Self electronics USA Corporation, Norcross, GA (US)

(72) Inventors: Zhaoyong Zheng, Zhejiang (CN); Feng Ji, Zhejiang (CN); Huangfeng Pan, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 16/688,790

(22) Filed: Nov. 19, 2019

(65) Prior Publication Data
US 2020/0332988 A1 Oct. 22, 2020

(30) Foreign Application Priority Data
Apr. 19, 2019 (CN) .......................... 201910320227.7

(51) Int. Cl.
*F21S 4/20* (2016.01)
*F21V 15/01* (2006.01)
*F21V 7/00* (2006.01)
*F21V 7/10* (2006.01)
*G02B 5/02* (2006.01)
*G02B 27/09* (2006.01)
*F21V 23/00* (2015.01)
(Continued)

(52) U.S. Cl.
CPC .................. *F21S 4/20* (2016.01); *F21K 9/69* (2016.08); *F21V 5/004* (2013.01); *F21V 7/0066* (2013.01); *F21V 7/10* (2013.01); *F21V 15/01* (2013.01); *F21V 19/008* (2013.01); *F21V 23/005* (2013.01); *G02B 5/0278* (2013.01); *G02B 27/0955* (2013.01); *F21Y 2103/10* (2016.08); *F21Y 2115/10* (2016.08)

(58) Field of Classification Search
CPC ...... F21K 9/69; F21S 4/20; F21S 4/28; F21V 5/002; F21V 5/004; F21V 5/008; F21V 5/04; F21V 5/08; F21V 7/005; F21V 7/0066; F21V 7/10; F21V 13/04; F21V 15/01; F21V 19/008; F21V 23/005; G02B 5/021; G02B 5/0278; G02B 19/0014; G02B 19/0019; G02B 19/0066; G02B 27/0911; G02B 27/0955
USPC .......................... 362/249.02–249.06, 311.02
See application file for complete search history.

(56) References Cited

U.S. PATENT DOCUMENTS 7,654,703 B2 * 2/2010 Kan ........................ F21V 23/02
362/362

* cited by examiner

*Primary Examiner* — Jason M Han
(74) *Attorney, Agent, or Firm* — Wang Law Firm, Inc.

(57) ABSTRACT

A tubular LED light fixture includes a lamp holder; printed circuit board; a plurality of point light sources; lens; strip-shaped convex lens array, located between the lens and printed circuit board and arranged along the length direction of the tubular LED light fixture for converting each point light source into a plurality of consecutive sub point light sources, and the sub point light source converted by the adjacent point light source is connected or overlapped. The invention adopts a strip-shaped convex lens array which forms a line light source only by diffusing light from the point light source only in the length direction of the strip light fixture, preventing light from diffusing in multiple directions, so that the line source is purified. The lens is arranged to perform light distribution in the other direction to the line source, thereby reducing energy attenuation and ensuring the light effect.

15 Claims, 9 Drawing Sheets

(51) Int. Cl.
*F21K 9/69* (2016.01)
*F21V 5/00* (2018.01)
*F21V 19/00* (2006.01)
*F21Y 115/10* (2016.01)
*F21Y 103/10* (2016.01)

TUBULAR LED FIXTURE

RELATED APPLICATION

This application claims priority to a Chinese Patent Application No. CN 201910320227.7, filed on Apr. 19, 2019.

FIELD OF THE TECHNOLOGY

The present invention relates to lighting technology field, with particular emphasis on a tubular LED light fixture.

BACKGROUND OF THE INVENTION

Under the background of energy conservation and environmental protection, LED lamps are more and more applied in the field of home and commercial lighting due to their high light emitting efficiency and good focusing performance.

At present, LED lamps on the market mainly use point source illumination. This type of illumination has problems of glare and reflection glare. In order to solve the above problems, researchers have tried to replace the point source with linear light source, generally adopting a method of adding a diffusion lamp cover, the diffusion lamp cover diffuses light from the LED, but because the diffusion direction is not single, the linear light source is imaged and blurred, and the formed linear light source is directly used to illuminate the illuminated surface, the light distribution effect is not good, and the energy attenuation is more, so that the formation linear light source is dim and cluttered, and the illumination that is ultimately projected onto the illuminated surface is uneven, resulting in poor illumination.

At the same time, the existing improved linear light source lamps are either bulky, or in order to achieve the linear light source effect, the LED lamps used are more numerous, which increases the production cost.

BRIEF SUMMARY OF THE INVENTION

In view of this, the present invention provides a tubular LED light fixture to solve the above technical problems.

A tubular LED light fixture comprises:
lamp holder;
printed circuit board, disposed on the lamp holder;
a plurality of point light sources, disposed on the light source mounting surface of the printed circuit board along a length direction of the tubular LED light fixture;
lens, disposed on the lamp holder in a light-emitting direction of the point light source for adjusting light distribution of the point light source on a plane perpendicular to the length direction of the tubular LED light fixture;
further comprising:
strip-shaped convex lens array, disposed on the lamp holder and located between the lens and the printed circuit board and arranged along the length direction of the tubular LED light fixture for converting each point light source into a plurality of consecutive sub point light sources, and the sub point light source converted by the adjacent point light source is connected or overlapped.

For ease of manufacture and for consideration of size, advantageously, the strip-shaped convex lens array is a positive cylindrical lens microarray arranged on an optical thin film.

For ease of manufacture, advantageously, the strip-shaped convex lens array is a positive cylindrical lens microarray array.

When the strip-shaped convex lens array is positive cylindrical lens array, the structure is flat, in order to adapt to different lamp structure, advantageously, the strip-shaped convex lens array is a curved surface that is curved in the length direction of the strip-shaped convex lens. The strip-shaped convex lens array can be used directly as a lamp shade.

In order to further improve the utilization of light, advantageously, on the plane perpendicular to the length direction of the LED light fixture, the reflection wall is provided on both sides of the point light source for reflecting the lateral light from the point light source to the light incident plane of the strip-shaped convex lens array.

To direct as much deflected light as possible to the strip-shaped convex lens array, advantageously, the reflection wall and the mounting surface of the point light source is arranged at an obtuse angle.

The shape of the lens can be designed according to the light output effect. In order to improve the uniformity of the light output, advantageously, the lens is a polarizing lens.

For manufacturing and design convenience, advantageously, the lens is a symmetrical lens.

In order to make the structure more compact, easy to manufacture and install, advantageously, the lamp holder comprises two end seats, a strip base and a strip bed plate, and the lens, the reflection wall and the strip bed plate are integrally formed and enclosed to form an mounting cavity.

In order to make the structure more compact, easy to manufacture and install, advantageously, the lamp holder comprises two end seats, a strip base and a strip bed plate, the reflection wall and the strip bed plate are integrally formed, and the inner side of the top of the two reflection walls is provided with a first mounting groove for fixing the strip-shaped convex lens array, and the outer side of the top of the two reflection walls is provided with a buckle structure for fixing the lens, and the bottom of the strip bed plate is provided with a second mounting groove for fixing the printed circuit board.

For manufacturing and installation, advantageously, the lamp holder comprises:
end seats;
strip base, two ends of which are connected with the end seats to form a first accommodating cavity;
strip bed plate, disposed at a bottom of the first accommodating cavity; and the strip bed plate is connected with the end seats to form a second accommodating cavity for accommodating the printed circuit board and the reflection wall.

For manufacturing and installation, advantageously, the inner side of the upper end of the strip base is provided with a first mounting groove, and the outer side of the reflection wall is provided with a convex edge that matches with the first mounting groove.

For manufacturing and installation, advantageously, the strip-shaped convex lens array is disposed on a top end of the reflection wall.

For manufacturing and installation, advantageously, the lens fits with the strip base by clasping.

Technical effects of the present invention:

The tubular LED light fixture of the present invention adopts a strip-shaped convex lens array which forms linear light source only by diffusing light from point light source only in the length direction of the light fixture, then it can well prevent the light from diffusing in multiple directions, so that the linear light source is purified, and the arrangement of the lens can perform light distribution on the linear light source in the other direction, thereby reducing the energy attenuation effect, and the secondary light distribution effect of the lens can realize uniform distribution of light as needed, so that the uniformity of illumination tends to 1, thereby improving the light-sweeping effect. The setting of the reflection wall can further improve the light utilization and better ensure the lighting effect.

BRIEF DESCRIPTION OF THE DRAWINGS

Embodiments of the present invention are described below in conjunction with the accompanying drawings, as follows.

DETAILED DESCRIPTION OF THE INVENTION

Specific embodiments of the present invention will be further described in detail below based on the drawings. It should be understood that the description of the embodiments herein is not intended to limit the scope of the invention.

Embodiment 1

As shown in FIG. 1 to 6, the tubular LED light fixture of the present embodiment comprises lamp holder 100, printed circuit board 200, a plurality of point light sources 300, lens 400, strip-shaped convex lens array 500, and reflection wall 600.

Figure 4:
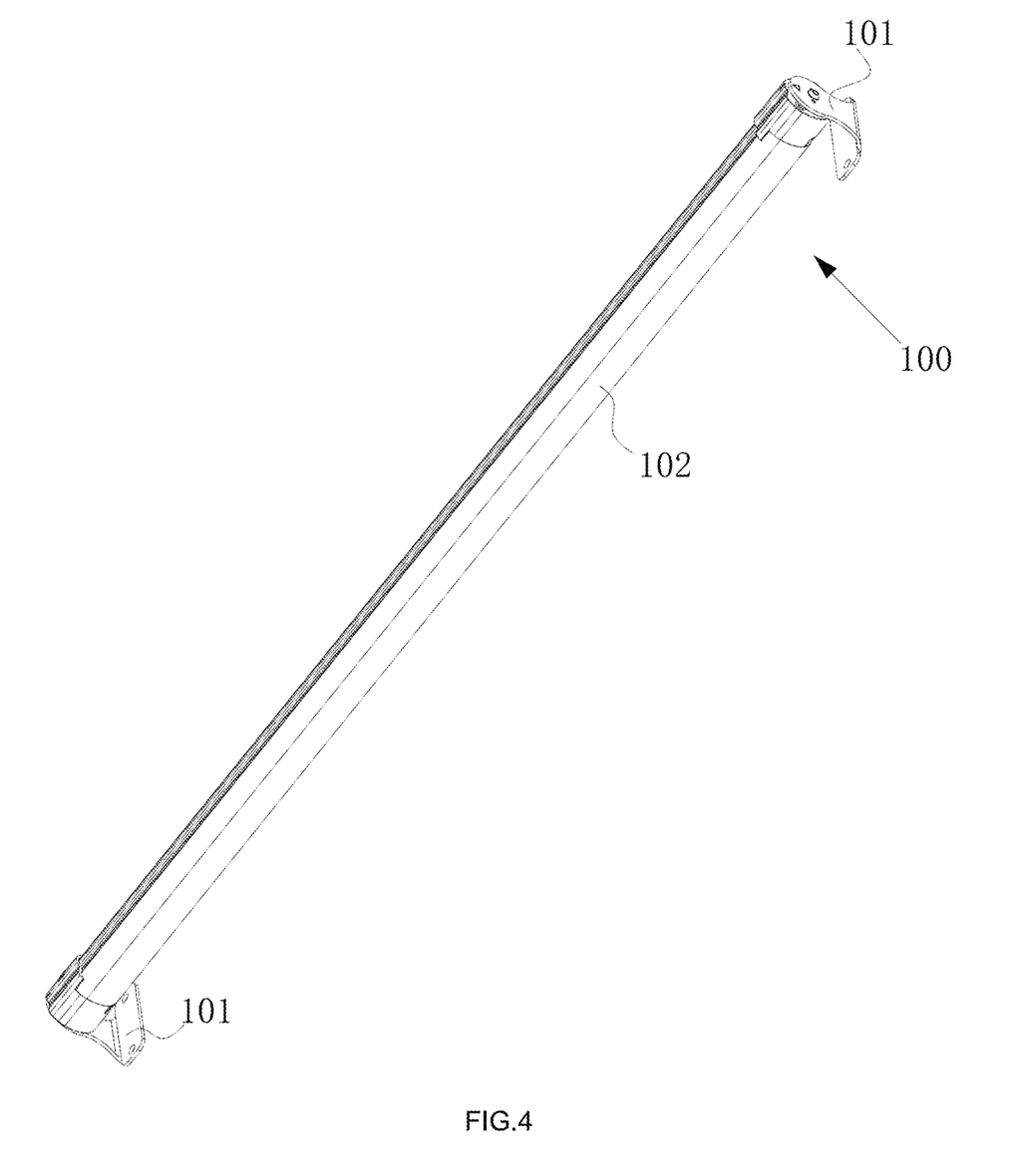
FIG. 4 is a schematic diagram of the three-dimensional structure of a tubular LED light fixture of the first embodiment.
Figure 5:
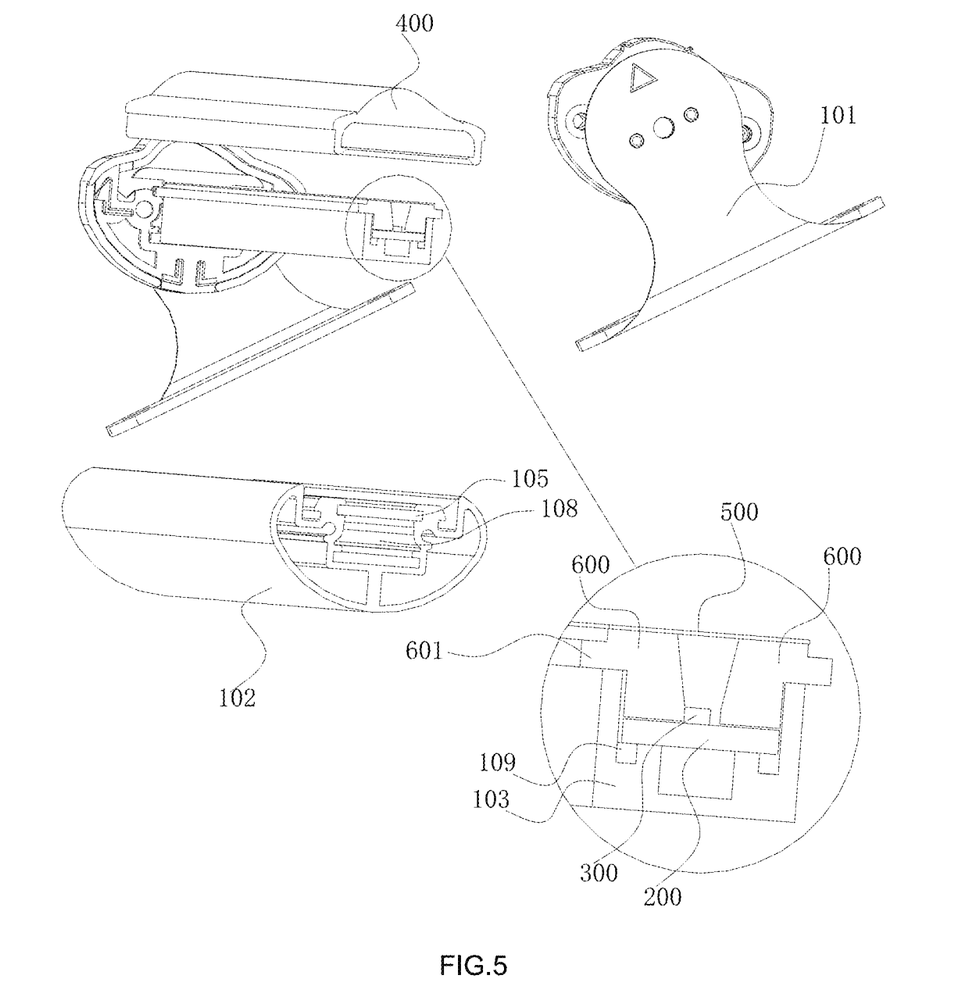
FIG. 5 is a schematic view showing the internal structure of the tubular LED light fixture of the first embodiment.

The lamp holder 100 is used for fixing and mounting, and can be assembled by a plurality of components according to installation requirements, or can be a single component. In this embodiment, the lamp holder 100 comprises two end seats 101, a strip base 102 and a strip bed plate 103. Both ends of the strip base 102 are fixedly connected to the end seat 101. The strip base 102 is provided with a cavity for accommodating the printed circuit board 200, the lens 400 and the reflection wall 600, and the printed circuit board 200, the lens 400 and the reflection wall 600 can be fixed by screws, glue and clasp structure. In this embodiment, the two ends of the strip base 102 are connected with the end seat 101 to form a first accommodating cavity 108. The strip bed plate 103 is located at the bottom of the first accommodating cavity 108, and the strip bed plate 103 is connected with the end seat to form a second accommodating cavity 109. The second accommodating cavity 109 is provided for accommodating the printed circuit board 200 and the reflection wall 600. The reflection wall 600 is located above the printed circuit board and on either side of the point light source. The inner side of the upper end of the strip base 102 is provided with a first mounting groove 105. The outer side of the reflection wall 600 is provided with a convex edge 601 matching with the first mounting groove 105. The strip-shaped convex lens array 500 is arranged on the top end of the reflection wall 600, and the Lens 400 fits with the strip base 102 by clamping.

A plurality of point light sources 300 are spaced apart from each other along the length direction of the tubular LED light fixture on the light source mounting surface of the printed circuit board 200. Thus, the visual effect of the discontinuous point light source is formed. In the background of energy saving and environmental protection, the LED lamp is more and more applied to the home and commercial lighting field due to its high light extraction efficiency and good light collecting performance, and the point light source 300 is adopted LED chip.

In this embodiment, the optical axis direction of the point light source 300 is set as the z direction, and the mounting surface of the point light source 300 is a plane perpendicular to the z direction. On the mounting surface, the point light source 300 is arranged in the x direction, and y direction is perpendicular to the x direction. The printed circuit board 200 is also disposed on the mounting surface, and the xyz coordinate system can define an x-y plane, a y-z plane, and an x-z plane.

The lens 400 is disposed on the lamp holder 100, specifically, the lens 400 is connected with the strip base 102 by clasping and located in a light-emitting direction of the point light source 300 for adjusting the light distribution of the point light source 300 on the plane (y-z plane) perpendicular to the length direction of the tubular LED light fixture, that is, the dimming in a single plane, and the lens 400 can be easily manufactured by extrusion process or other ways. Since the light distribution of the LED chip itself is not uniform, this causes the linear light source imaged by the strip-shaped convex lens array 500 to have a region with strong brightness and weak brightness. It is easy to understand that the less luminous areas emitted light with less energy, while the more luminous areas emitted light with more energy. In order to make the final emergent light evenly distributed, the lens 400 preferably adopts an asymmetric lens, and the light in the weak brightness region of the linear light source is emitted from the part of the asymmetric lens that has a strong ability to focus light, while the light in the strong brightness region is emitted from the part of the asymmetric lens that has a weak ability to focus light, in this way, the consistent effect of the emergent light can be reasonably achieved. However, this does not mean that the lens 400 can only adopt an asymmetrical form, and a symmetrical form can also be used. In this case, the brightness of the two ends of the linear light source is brighter, and the brightness toward the middle position is weaker. When a symmetrical lens is used, the middle protruding portion of the lens 400 corresponds to the middle position of the linear light source, and both ends correspond to both ends of the linear light source, so that the light can be uniform.

Figure 1:
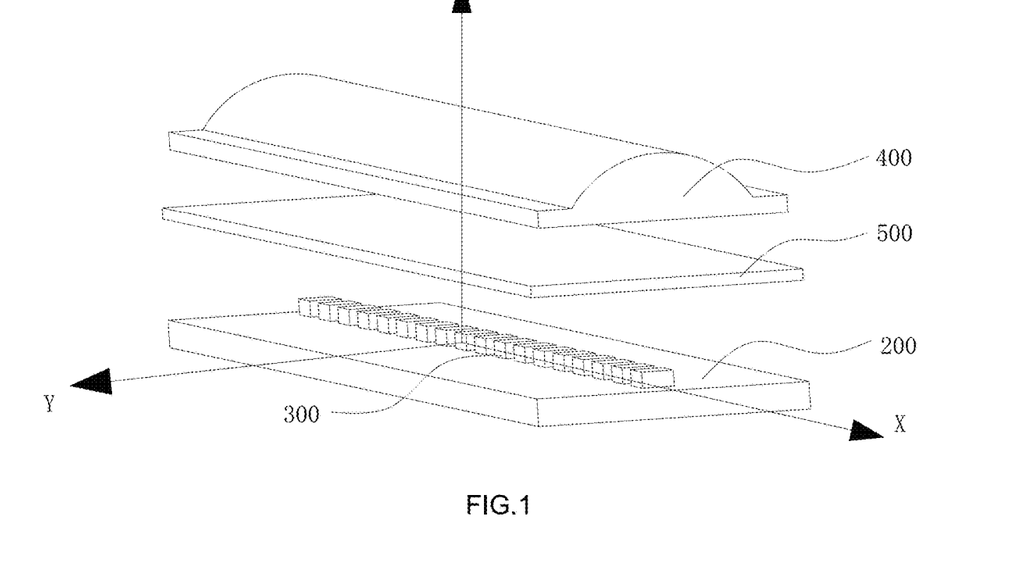
FIG. 1 is a schematic view showing the principle structure of a tubular LED light fixture of the present invention.
Figure 2:
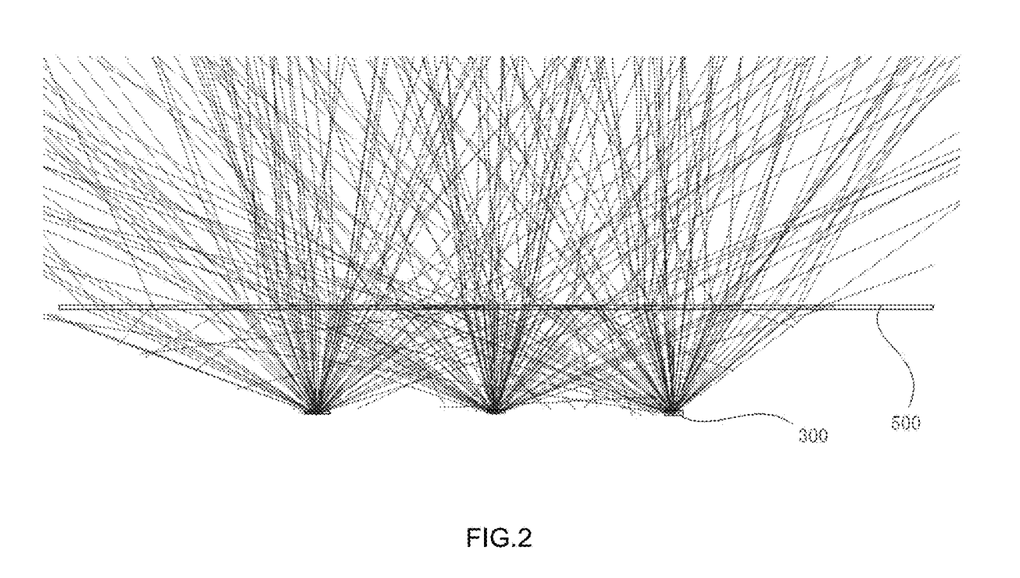
FIG. 2 is a schematic view showing the lighting direction of light rays in the length direction of the tubular LED light fixture of the present invention.

The strip-shaped convex lens array 500 is disposed on the lamp holder 100 and located between the lens 400 and the printed circuit board 200. The strip-shaped convex lens array 500 is arranged along the length direction of the tubular LED light fixture for converting each point light source 300 into a plurality of continuous sub-point light sources, the sub-point light sources converted by the adjacent point source 300 is connected or coincident. It can be seen that before using the strip-shaped convex lens array 500, the point light sources 300 are still point light sources after passing through the lens 400 and become linear light sources while adding the strip-shaped convex lens array 500 they, as shown in FIG. 2.

Figure 3:
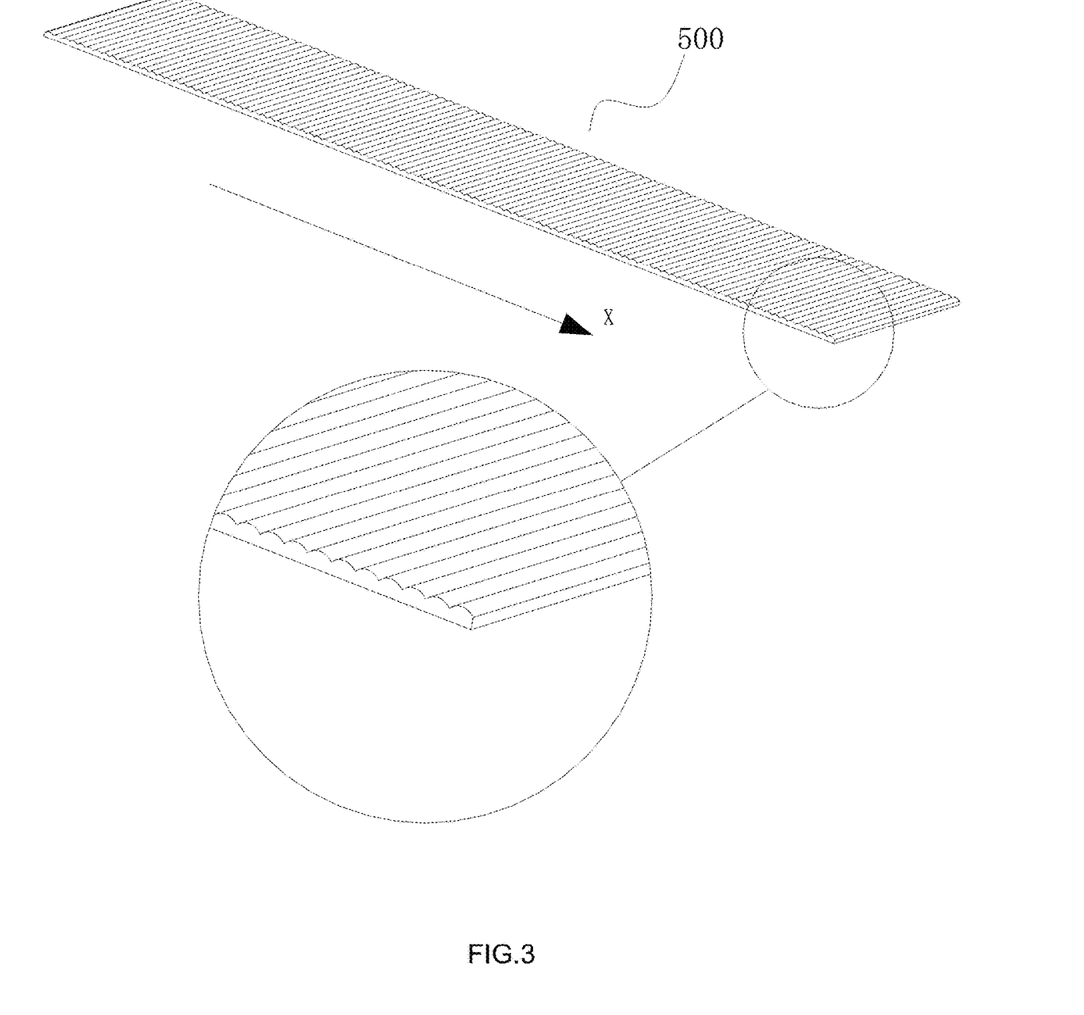
FIG. 3 is a schematic structural view of a positive cylindrical lens array.
Figure 6:
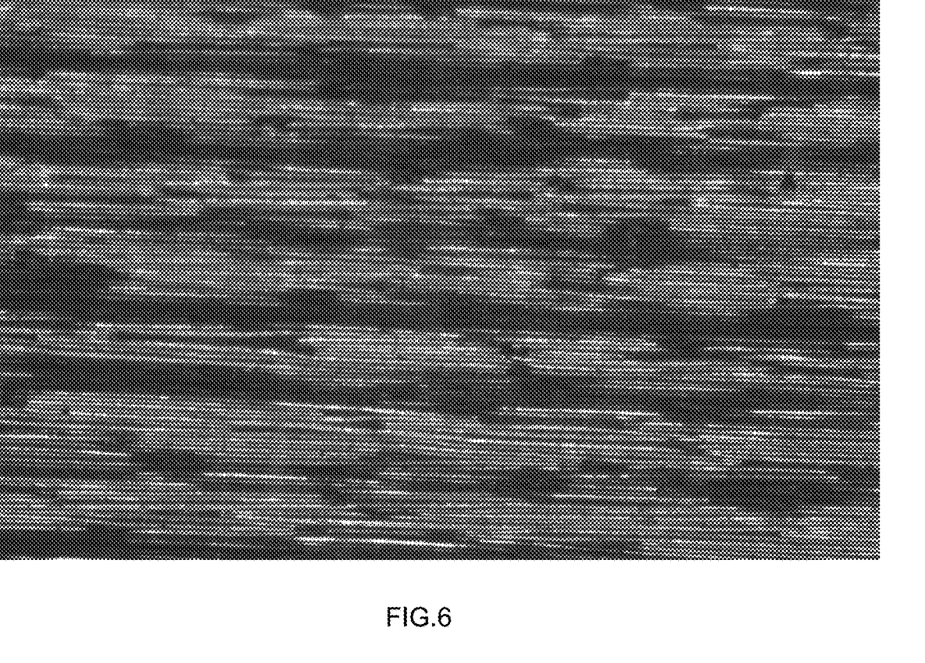
FIG. 6 is an enlarged view of an elliptical light diffusion film used in the first embodiment.

The strip-shaped convex lens in the strip-shaped convex lens array 500 can be in the form of a plane of a positive cylindrical lens, or can be a curved surface curved in the length direction of the strip-shaped convex lens, and the effect to be achieved is that the point light source is stretched in the arrangement direction (x direction) of the point light source, so that the point light source forms the line light source while minimizing or eliminating the influence on the point source 300 in other directions. The cross-sectional dimension of the strip-shaped convex lens can be set as needed, and the strip-shaped convex lens array 500 can be obtained by a process such as 3D printing, extrusion or injection molding. The distance between the strip-shaped convex lens array 500 and the point light source 300 and the distance between the adjacent point light sources 300 are controlled by adjusting the radian and radius of the strip-shaped convex lens. The strip-shaped convex lens array 500 can also achieve the same effect by using optical film. In the embodiment, the strip-shaped convex lens array 500 is a positive cylindrical lens microarray arranged on the optical thin film, specifically, the optical film is an elliptical light diffusing film, and the model used is E-6010. Of course, other models can be selected as long as the point light source 300 is stretched in the arrangement direction (x direction) of the point light source 300. For example, E-1560, E-0160/6001, E-0190 can also be used. In order to achieve a better tensile diffusion effect, when the diffusion film is selected, the stretching ratio in both directions is greater than 4. In the present embodiment, the elliptical light diffusing film is a positive cylindrical lens microarray, the length direction of the positive cylindrical lens is perpendicular to the arrangement direction (x direction) of the point light source 300 when used. The strip-shaped convex lens array 500 in the form of film has a small volume, is easy to install, and can be bent to meet different lamp structure requirements.

In order to further improve the light utilization rate of the LED light fixture, on the plane perpendicular to the length direction of the LED light fixture, the reflection wall 600 is provided on both sides of the point light source 300 for reflecting the lateral light from the point light source 300 to the light incident plane of the strip-shaped convex lens array 500. Of course, the absence of the reflection wall 600 does not affect the use of the tubular LED light fixture, that is, the reflection wall 600 is not an essential functional component, the upper end of the reflection wall 600 extends to the bottom surface of the strip-shaped convex lens array 500, and the point light source 300 is disposed on the printed circuit board 200, most of the light is emitted toward the strip-shaped convex lens array 500, but a small portion of the lateral light is deflected away from the main beam and directed to other directions, and such light is often not utilized, so that the effective utilization rate of the light is reduced, which is a common problem in which the light source emits radiation in a radial manner. When the above design is adopted, it can make good use of the reflection effect to direct the deviated lateral light to the strip-shaped convex lens array 500, thereby concentrating the light beam, and the luminous flux which is truly formed by the strip-shaped convex lens array 500 per unit area is more. Moreover, it improves the effective utilization of light, and reduces the number of point light sources 300 to reduce costs.

At the same time, in order to guide the deflecting light to the direction of the strip-shaped convex lens array 500 as much as possible, according to the light propagation path and the light radiation angle principle of the point light source 300, in the embodiment, the reflection wall 600 and the printed circuit board 200 is disposed at an obtuse angle, and the specific angle is adjusted according to the distance between the point light source 300 and the strip-shaped convex lens array 500.

Embodiment 2

Figure 7:
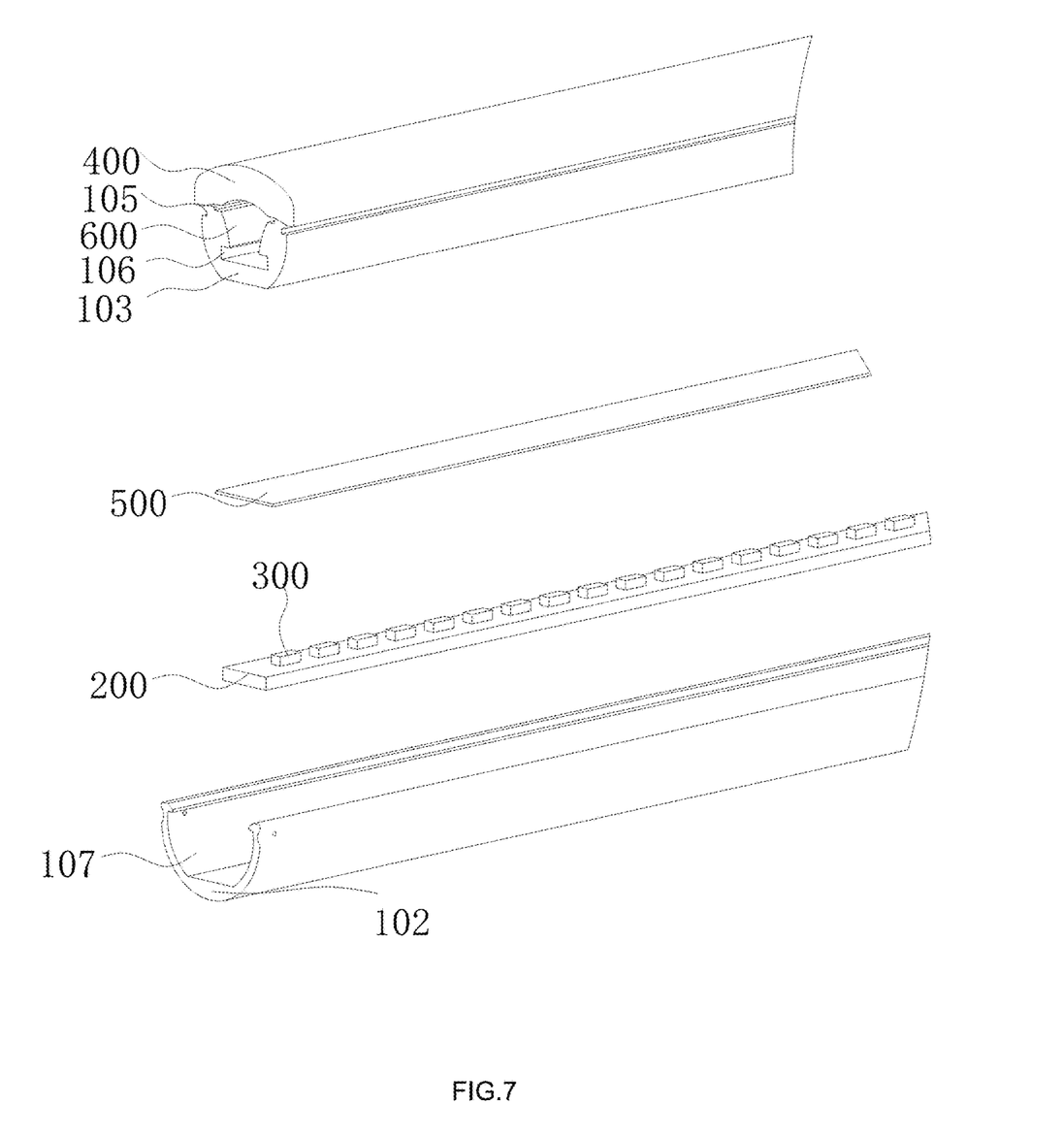
FIG. 7 is an explosion schematic diagram of the partial structure of the tubular LED light fixture of the second embodiment.
Figure 8:
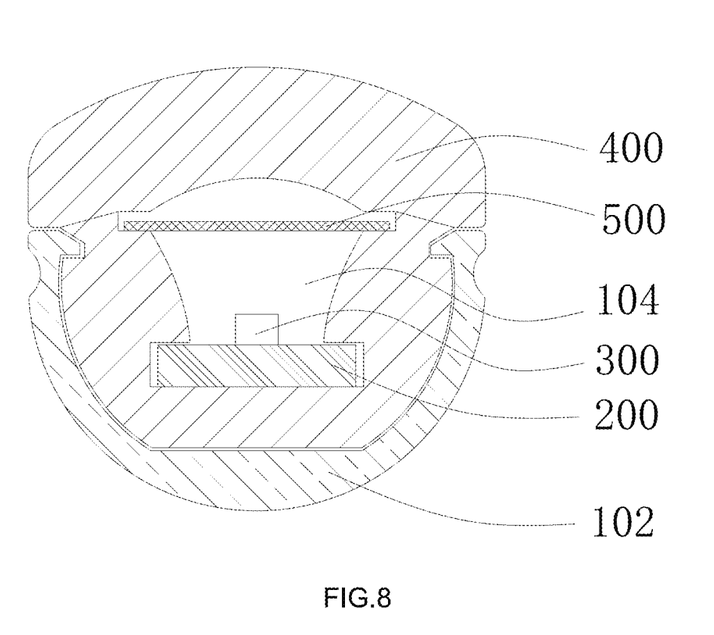
FIG. 8 is a sectional schematic diagram of the tubular LED light fixture of the second embodiment.

As shown in FIGS. 7 and 8, the main components and positional relationship of the tubular LED light fixture of this embodiment are the same as those of the first embodiment, except for the shape of the lens 400 and the connection manner of the respective members.

In this embodiment, the lens 400, the reflection wall 600 and the strip bed plate 103 are integrally formed and enclosed to form an mounting cavity 104. Extrusion process can be used for integral forming. The lens 400 adopts a symmetrical lens and has a radian change on both the inside and outside surfaces, which is easier to manufacture. In the mounting cavity 104, a first mounting groove 105 for fixing the strip-shaped convex lens array 500 is disposed near the lens 400, and the bottom portion of the mounting cavity 104 is provided a second mounting groove 106 for fixing the printed circuit board 200, the side wall between the first mounting groove 105 and the second mounting groove 106 is the reflection wall 600, and the reflection wall 600 is of the arc structure, so that the reflection angle is smaller and the efficiency is higher.

The strip base 102 is made of metal with better heat dissipation effect, and is provided with a curved mounting groove 107 for fixing the strip bed plate 103. The bottom surface of the strip bed plate 103 is a curved surface that fits the curved mounting groove 107, thereby improving the heat dissipation effect.

The strip-shaped convex lens array 500 of the present embodiment also employs an elliptical light diffusing film, and both sides in the width direction are inserted into the first mounting groove 105 for assembly.

Embodiment 3

Figure 9:
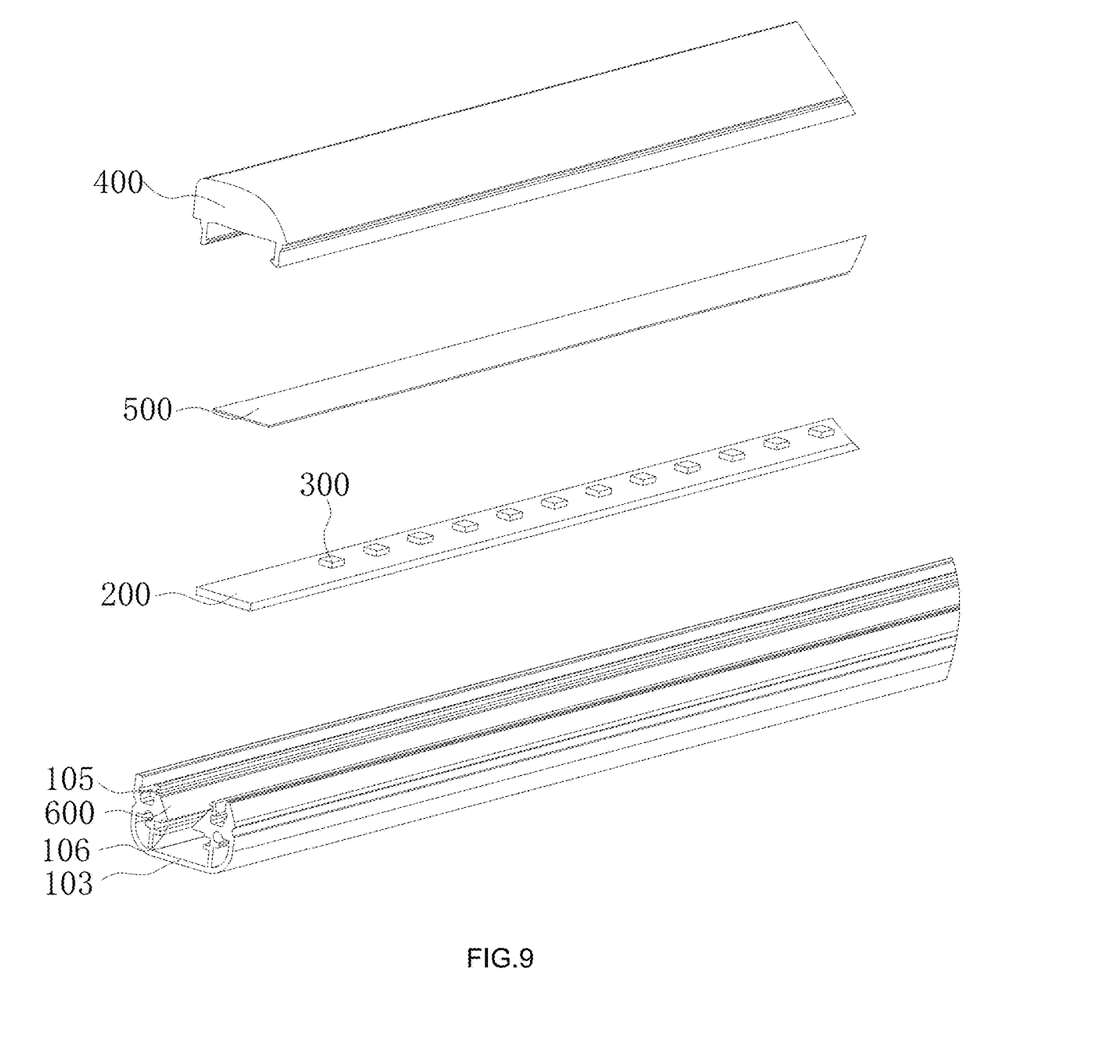
FIG. 9 is an explosion schematic diagram of the partial structure of the tubular LED light fixture of the third embodiment.
Figure 10:
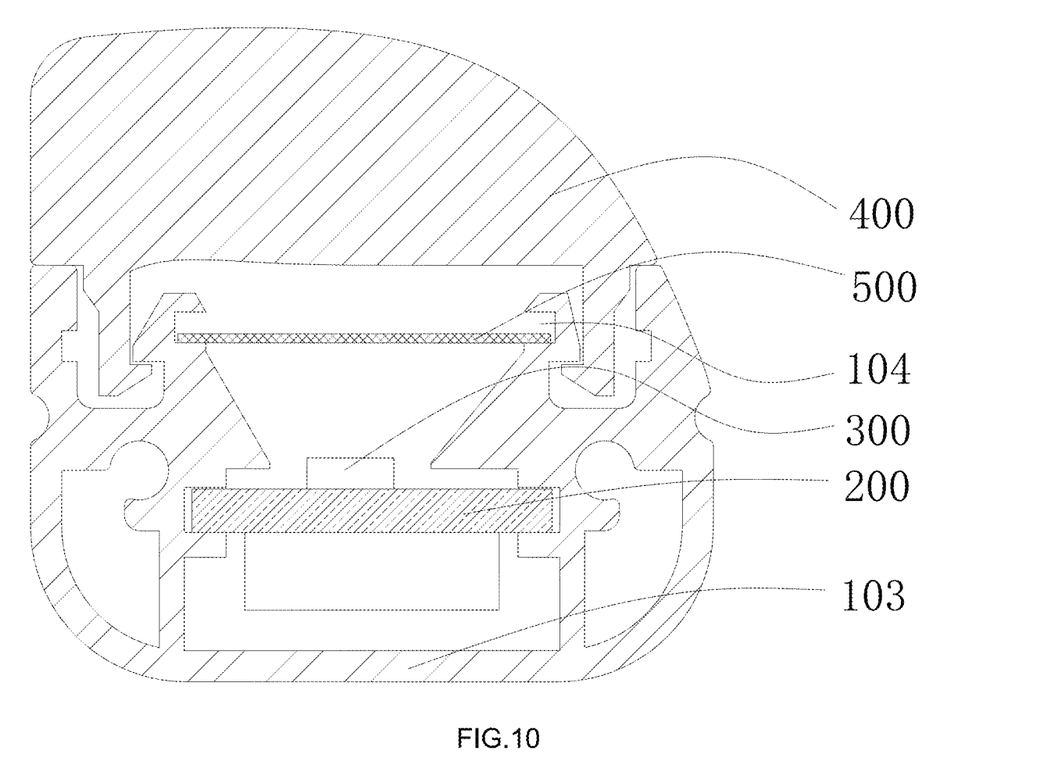
FIG. 10 is a sectional schematic diagram of the tubular LED light fixture of the third embodiment.

As shown in FIGS. 9 and 10, the main components and positional relationship of the tubular LED light fixture in this embodiment are the same as those of the first embodiment, except for the shape of the lens 400 and the connection manner of the respective members.

In this embodiment, the reflection wall 600 and the strip bed plate 103 are integrally formed. The inner side of the top of the two reflection walls 600 is provided with a first mounting groove 105 for fixing the strip-shaped convex lens array 500, and the outer side of the top of the two reflection walls 600 is provided with a buckle structure for fixing the lens 400, and a second mounting groove 106 for fixing the printed circuit board 200 is provided at the bottom of the strip bed plate 103.

The strip-shaped convex lens array 500 of the present embodiment also employs an elliptical light diffusing film, and both sides in the width direction are inserted into the first mounting groove 105 for assembly.

In this embodiment, the lens 400 is a polarizing lens for adjusting the light distribution of the point light source 300 on a plane (y-z plane) perpendicular to the length direction of the tubular LED light fixture. The viewing angle in the figure is that the light is polarized to the left.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

What is claimed is:

1. A tubular LED light fixture comprising:
    a lamp holder;
    a printed circuit board, disposed on the lamp holder;
    a plurality of point light sources, disposed on a light source mounting surface of the printed circuit board along a lengthwise direction of the tubular LED light fixture;
    lens, disposed on the lamp holder in a light-emitting direction of the point light source for adjusting light distribution of the point light source on a plane perpendicular to the lengthwise direction of the tubular LED light fixture;
    reflection walls, provided on both sides of the point light source on the plane perpendicular to the lengthwise direction of the LED light fixture, for reflecting lateral light from the point light source to a light incident plane of the strip-shaped convex lens array;
    wherein
    the lamp holder further comprises
        end seats,
        a strip base, having an upper end and a lower end which are connected with the end seats to form a first accommodating cavity, and
        a strip bed plate, disposed at a bottom of the first accommodating cavity, and the strip bed plate is connected with the end seats to form a second accommodating cavity for accommodating the printed circuit board and the reflection walls,
    an inner side of the upper end of the strip base is provided with a first mounting groove, and an outer side of the reflection walls is provided with a convex edge that matches to the first mounting groove,
    a strip-shaped convex lens array, disposed on the lamp holder and located between the lens and the printed circuit board and arranged along the lengthwise direction of the tubular LED light fixture for converting each point light source into a plurality of consecutive sub point light sources, and the sub point light sources converted by the adjacent point light source are connected or overlapped.

2. The tubular LED light fixture as claimed in claim 1, wherein the strip-shaped convex lens array is a positive cylindrical lens microarray arranged on an optical thin film.

3. The tubular LED light fixture as claimed in claim 1, wherein the strip-shaped convex lens array is a positive cylindrical lens microarray array.

4. The tubular LED light fixture as claimed in claim 1, wherein the strip-shaped convex lens array is a curved surface that is curved in the lengthwise direction of the strip-shaped convex lens.

5. The tubular LED light fixture as claimed in claim 1, wherein the point light source adopts LED chip.

6. The tubular LED light fixture as claimed in claim 1, wherein the reflection walls and the mounting surface of the point light source are arranged at an obtuse angle.

7. The tubular LED light fixture as claimed in claim 1, wherein the lens is a polarizing lens.

8. The tubular LED light fixture as claimed in claim 1, wherein the lens is a symmetrical lens.

9. The tubular LED light fixture as claimed in claim 1, wherein the lamp holder comprises two end seats, a strip base and a strip bed plate, and the lens, the reflection walls and the strip bed plate are integrally formed and enclosed to form a mounting cavity.

10. The tubular LED light fixture as claimed in claim 1, wherein the lamp holder comprises two end seats, a strip base and a strip bed plate, the reflection walls and the strip bed plate are integrally formed, and the inner side of the top of the two reflection walls is provided with a first mounting groove for fixing the strip-shaped convex lens array, and the outer side of the top of the two reflection walls is provided with a buckle structure for fixing the lens, and the bottom of the strip bed plate is provided with a second mounting groove for fixing the printed circuit board.

11. The tubular LED light fixture as claimed in claim 1, wherein the strip-shaped convex lens array is disposed on a top end of the reflection walls.

12. The tubular LED light fixture as claimed in claim 11, wherein the lens fits with the strip base by clasping.

13. The tubular LED light fixture as claimed in claim 1, wherein the lens fits with the strip base by clasping.

14. A tubular LED light fixture comprising:
    a lamp holder with a first accommodating cavity formed by two end seats and a strip base;
    a printed circuit board, disposed inside the lamp holder;
    a plurality of point light sources, disposed on a light source mounting surface of the printed circuit board along a lengthwise direction of the tubular LED light fixture;
    lens, mounted on the lamp holder;
    reflection walls, provided on both sides of the point light source, for reflecting lateral light from the point light source to a light incident plane of the strip-shaped convex lens array;
    wherein
        a strip bed plate, disposed at a bottom of the first accommodating cavity; and the strip bed plate is connected with the end seats to form a second accommodating cavity for accommodating the printed circuit board and the reflection walls, and
        an inner side of an upper end of the strip base is provided with a first mounting groove, and an outer side of the reflection walls is provided with a convex edge that matches to the first mounting groove.

15. The tubular LED light fixture of claim 14, further comprising a strip-shaped convex lens array, disposed on the lamp holder and located between the lens and the printed circuit board and arranged along the lengthwise direction of the tubular LED light fixture for converting each point light source into a plurality of consecutive sub point light sources, and the sub point light sources converted by the adjacent point light source are connected or overlapped.

* * * * *